UNITED STATES PATENT OFFICE.

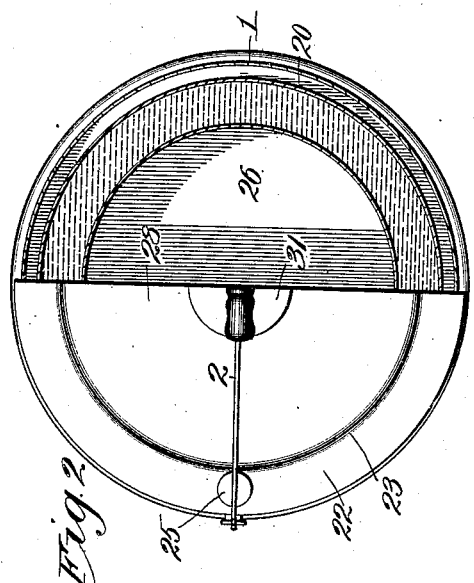

JAMES PETRACEK, OF OBERLIN, KANSAS, ADMINISTRATOR OF THE ESTATE OF ANTHONY KOLSKY, DECEASED.

DINNER-PAIL.

No. 915,715.  Specification of Letters Patent.  Patented March 16, 1909.

Application filed October 26, 1908. Serial No. 459,585.

*To all whom it may concern:*

Be it known that I, JAMES PETRACEK, a citizen of the United States, and a resident of Oberlin, in the county of Decatur, State of Kansas, am administrator of the estate of ANTHONY KOLSKY, deceased, who invented the new and useful Improvements in Dinner-Pails, of which the following is a specification.

This invention relates to dinner pails and its object is to produce an article of this character equipped with self-contained means for heating coffee and a lunch within the pail.

A further object is to produce a pail of the character outlined which can be made cheaply and which is of simple, durable and compact construction.

With these general objects in view and others as hereinafter appear, the invention consists in certain novel and peculiar features of construction and organization as hereinafter described and claimed; and in order that it may be fully understood reference is to be had to the accompanying drawing, in which:

Figure 1 is a central vertical section of a dinner pail embodying the invention. Fig. 2 is a view taken on the line II—II of Fig. 1. Fig. 3 is a horizontal section taken on the line III—III of Fig. 1.

In the said drawing, 1 indicates a cylindrical shell provided with a handle or bail 2. It is also provided near its lower end with a series of perforations 3 and near its upper end with a second series of perforations 4. The shell is provided with a bottom 5 and fitting snugly in the shell and resting upon said bottom is a lamp body 6 provided with a filling tube 7 normally closed by cap 8.

9 is a wick tube extending down into the body 6 and within the latter provided with perforations 10, and provided above the body with an enlargement or burner 11, which is perforated at its upper side as at 12.

13 indicates bars arranged radially of and secured at their inner ends to the top of the lamp body 6 and terminating at their outer ends in downturned legs 14 which rest upon said body. Above the lamp and resting upon said bars 13 is a perforated cylinder 15 of less diameter than and arranged concentrically of shell 1 and terminating at its lower end in an outwardly projecting flange 16.

17 indicates a bottom for said cylinder 15, shaped near its outer edge to receive the gutter-shaped flange and bent back at its margin at 18 to interlock with said flange, and said bottom is also provided centrally with an opening 19 of somewhat greater diameter than the burner of the wick tube, in order that said perforated cylinder 15 may be easily and quickly slipped in or removed from position.

20 indicates a bucket which fits snugly within shell 1 just above perforations 4 and from a point above the latter, converges downward and rests upon and closes the upper end of cylinder 15. The upper end of bucket 20 is provided with an outwardly projecting flange 21 to rest upon the upper end of the shell, and projecting inwardly from said flange is an inwardly projecting top flange 22 of circular form, stamped downward at its inner edge to provide a recess 23, said flange 22 being also provided with a spout 24 and a cap 25 to normally close said spout.

26 indicates an inner bucket depending in the bucket 20 and provided in its upper end with an annular flange 27 to occupy the recess 23 and be suspended from flange 22 in the bucket 20, and said bucket 26 is provided with a removable cover 28 having a filling opening 29 surrounded by an upwardly projecting neck 30, a cap 31 normally fitting on said neck and forming a closure for bucket 26.

In practice the bucket 20 is adapted to contain coffee or any other beverage while the bucket 26 is adapted to contain a lunch, by preference. Assuming that the owner of the bucket desires to heat his coffee and warm his lunch, he first removes buckets 20 and 26 and applies a lighted match to the burner 11, the oil from the body of the lamp being carried upward by capillary attraction through the wick. He then replaces the said buckets and the flame from the burner impinges upon bucket 20 so as to quickly raise the coffee or other liquid therein to the desired temperature which coffee or other liquid, in turn, imparts heat to the contents of the bucket 26, combustion being supported because air passes through perforations 3 into the space between the lamp body and the bottom of cylinder 15, and thence upward through opening 19 around the burner, the products of combustion passing outward through the perforated cylinder 15 and thence upward between the casing and bucket 20 and eventually outward through the perforations 4. It will thus be seen that the coffee or other beverage can be quickly raised to the desired temperature and that heat from the same is imparted to the contents of bucket 26.

When the owner desires to drink the coffee, he removes the caps 25 and 31 and utilizes the latter as a cup to receive the liquid poured from bucket 20 through the tube or spout 24 and drinks from said cup, the cover 28 of bucket 26 being removed when access to his lunch is desired. To extinguish the flame he removes both buckets and thus exposes the burner so that the flame can be extinguished by blowing upon it.

From the above description it will be apparent that a dinner pail is produced embodying the desirable features of advantage enumerated, and which is susceptible of modification as regards its form, proportion, detail construction and organization without departing from the principle and scope or sacrificing any of the advantages of the appended claims.

Having thus described the invention what is claimed as new and desired to be secured by Letters Patent, is:—

1. A dinner pail, comprising a shell provided with a bottom and open at the top and provided near the bottom with perforations and near the top with other perforations, a lamp within and upon the bottom of the shell and provided with an upwardly projecting burner, a perforated cylinder surrounding the burner and arranged within the shell above the lamp and provided with a bottom having a central opening to conduct air from below said bottom into said perforated cylinder around the burner, and a bucket fitting in the shell and resting on the perforated cylinder and spaced from the shell from its lower end to a point above the upper perforations of the shell.

2. A dinner pail, comprising a shell provided with a bottom and open at the top and provided near the bottom with perforations and near the top with other perforations, a lamp within and upon the bottom of the shell and provided with an upwardly projecting burner, a perforated cylinder surrounding the burner and arranged within the shell above the lamp and provided with a bottom having a central opening to conduct air from below said bottom into said perforated cylinder around the burner, a bucket fitting in the shell and resting on the perforated cylinder and spaced from the shell from its lower end to a point above the upper perforations of the shell, and a smaller bucket depending into the first-named bucket.

3. A dinner pail, comprising a shell provided with a bottom and open at the top and provided near the bottom with perforations and near the top with other perforations, a lamp within and upon the bottom of the shell and provided with an upwardly projecting burner, a perforated cylinder surrounding the burner and arranged within the shell above the lamp and provided with a bottom having a central opening to conduct air from below said bottom into said perforated cylinder around the burner, and a bucket fitting in the shell and resting on the perforated cylinder and spaced from the shell from its lower end to a point above the upper perforations of the shell and provided at its upper end with a spout and a cap for closing the same.

4. A dinner pail, comprising a shell provided with a bottom and open at the top and provided near the bottom with perforations and near the top with other perforations, a lamp within and upon the bottom of the shell and provided with an upwardly projecting burner, a perforated cylinder surrounding the burner and arranged within the shell above the lamp and provided with a bottom having a central opening to conduct air from below said bottom into said perforated cylinder around the burner, a bucket fitting in the shell and resting on the perforated cylinder and spaced from the shell from its lower end to a point above the upper perforations of the shell, a flange projecting outwardly from the upper end of the bucket to rest upon the upper end of the shell, a circular flange projecting inwardly from the first-named flange and provided with a spout and a cap closing the same, a bucket suspended from said inwardly-projecting flange down into the first-named bucket, and a cover for said suspended bucket.

5. A dinner pail, comprising a shell provided with a bottom and open at the top and provided near the bottom with perforations and near the top with other perforations, a lamp within and upon the bottom of the shell and provided with an upwardly projecting burner, a perforated cylinder surrounding the burner and arranged within the shell above the lamp and provided with a bottom having a central opening to conduct air from below said bottom into said perforated cylinder around the burner, a bucket fitting in the shell and resting on the perforated cylinder and spaced from the shell from its lower end to a point above the upper perforations of the shell, a flange projecting outwardly from the upper end of the bucket to rest upon the upper end of the shell, a circular flange projecting inwardly from the first-named flange and provided with a spout and a cap closing the same, a bucket suspended from said inwardly-projecting flange down into the first-named bucket, a cover for said suspended bucket, provided with a central opening and an upwardly projecting neck surrounding said opening, and a cap fitting upon said neck and covering the same.

6. A dinner pail, comprising a shell open at its upper end and provided with a bottom at its lower end and with two series of perforations, one near the bottom and the other near the top, a lamp fitting within the shell and upon the bottom thereof and provided centrally with an upwardly projecting burner, bars projecting outward from the lamp, a cylinder surrounding the burner and provided with perforations and with a bottom resting on said bars and provided centrally with an opening surrounding the burner of the lamp, a bucket fitting snugly in the shell above the topmost series of perforations of the latter and spaced from said shell from said point of contact to its lower end and resting upon and covering the perforated cylinder, a pail or handle for the shell, and a bucket suspended from and within the first-named bucket.

In testimony whereof I affix my signature in the presence of two witnesses.

JAMES PETRACEK,
*Administrator of the estate of Anthony Kolsky*

Witnesses:
M. G. FEELY,
O. T. ROUSE.